United States Patent [19]
Le Francois et al.

[11] Patent Number: 5,648,888
[45] Date of Patent: Jul. 15, 1997

[54] POWER DISTRIBUTION SUBSTATION

[75] Inventors: Jacques Le Francois, St-Hyacinthe; Mathias Kolos, Beaconsfield; Denis Guenette, St-Mathieu de Beloeil, all of Canada

[73] Assignee: Hydro-Quebec, Montreal, Canada

[21] Appl. No.: 578,898

[22] Filed: Dec. 27, 1995

[51] Int. Cl.⁶ .................................................. H02B 5/04
[52] U.S. Cl. ........................... 361/603; 307/147; 361/623
[58] Field of Search .................................. 200/48 R, 48 A; 307/147; 361/601–603, 611, 620, 622, 623, 641, 688, 690

[56] References Cited

U.S. PATENT DOCUMENTS

| | | | |
|---|---|---|---|
| 2,952,799 | 9/1960 | Wortman | 361/602 |
| 4,200,899 | 4/1980 | Volman | 361/333 |
| 4,500,935 | 2/1985 | Tsuruta | 361/333 |
| 5,483,417 | 1/1996 | Tanimizu | 361/611 |

FOREIGN PATENT DOCUMENTS

| | | | |
|---|---|---|---|
| 1196715 | 11/1985 | Canada . | |
| 2303399 | 10/1976 | France . | |
| 2566199 | 12/1985 | France . | |
| 2579031 | 9/1986 | France . | |
| 2669782 | 5/1992 | France . | |
| 1181772 | 10/1958 | Germany . | |
| 5-56522 | 3/1993 | Japan | 361/603 |
| 375727 | 3/1973 | U.S.S.R. . | |
| 1798845 | 2/1993 | U.S.S.R. . | |
| 916391 | 1/1963 | United Kingdom | 361/602 |

*Primary Examiner*—Gerald P. Tolin
*Attorney, Agent, or Firm*—Foley & Lardner

[57] ABSTRACT

Disclosed is a power distribution substation for power distribution to a consumption pool having a high voltage unit divided into cells, each cell containing high voltage incoming connection equipments connected by high voltage cables to a power source having a voltage between 60 kV and 245 kV. The substation also has a transformers yard having at least one transformer connected to the high voltage incoming connection equipments, and a mid-voltage unit containing outgoing connection equipments connected to the transformer and linked to output power lines for power distribution under a voltage lower than or equal to 36 kV. Finally, the substation has a control room. The high voltage and mid-voltage units, the transformers yard and the control room are located in a single building having a roof where the high voltage incoming connection equipments, the transformer(s) and some of the outgoing connection equipments ate located at the same level inside the building. The substation includes an access passage that forms an integral part of the building. The access passage is designed to insure direct access to the cells of the high voltage unit, the transformers yard and the mid-voltage unit. The roof over the transformers yard has slats that may be opened and closed in order to allow cooling of the transformer(s) or recuperation of the heat generated by the transformer(s) whenever necessary. Preferably, the outgoing connection equipments of the mid-voltage unit are of the self-relieving switchless type and incorporate a removable circuit breaker permutation system. The substation is extremely compact, is of easy maintenance and is soundproof. It is non-polluting as it may have an oil retention system. This substation is thus particularly well adapted for urban use, while offering unlimited architectural designs.

17 Claims, 11 Drawing Sheets

POWER DISTRIBUTION SUBSTATION

FIELD OF THE INVENTION

The present invention relates to an improved power distribution substation.

The term "power distribution substation" as used hereinafter is meant to include any kind of electric substation, also known as "power transformer and distribution substation", where high voltage power ranging from 60 kV to 245 kV is converted and distributed to a consumption pool under a voltage lower than or equal to 36 kV.

BRIEF DESCRIPTION OF THE PRIOR ART

The existing power distribution substations can broadly be classified into three categories.

The first category of existing substations includes "exterior" substations, where the equipments and connections are installed outside, on a given site. These substations generally cover a large surface area and are not aesthetically pleasing. Given their design, these substations require a lot of maintenance, as the equipment is subject to the climatic conditions of the site, which can be hard.

The second category of existing substations includes the "metalclad" substations, where the equipment is located in sealed enclosures and insulated by a pressurized fluid. These metalclad substations are much smaller than the exterior substations and have their equipment completely protected. However, their fabrication and maintenance costs are very high.

The third category of existing substations includes the "interior" substations. These substations include a partitioned building in which the equipment is located and insulated by ambient air. Given their structure, these substations are often used in urban centres, as they are relatively compact and much more aesthetic than exterior substations.

From a practical standpoint, the existing interior substations may include up to three transformers, each operating well under their maximum efficiency rate so that in the event of a failure, its complete load may be redistributed to one or the other transformers. The interior substations also include at least two independent incoming high voltage lines, each capable of supporting the totality of the required power. This insures a continuity in the distribution to the consumption pool even in the event of a breakdown of a transformer or a rupture of one of the incoming lines.

For example of such interior substations, reference may be made to the following documents:

Canadian patent no.: 1,196,715 of 1985 (ALSTROM-ATLANTIQUE)

French laid-open patent applications nos: 2,566,199 of 1985 (MERLIN GERIN) 2,579,031 of 1986 (MERLIN GERIN) 2,669,782 of 1992 (ENTERPRISE INDUSTRIELLE)

German patent application no.: 1,181,772 of 1964 (CALOR-EMAG ELEKTRIZATS)

If the existing interior substations have the advantage of compartmentalizing the high voltage equipment, protecting the other equipments and being more compact and aesthetic than those of the other categories mentioned hereinabove, they also have the disadvantage of not having a practical access passage to transport the equipment (transformers, switches, circuit breakers, etc.) and to replace them when necessary, which is indispensable for proper maintenance.

Furthermore, in the existing interior substations, the high voltage equipment is usually located on two different levels, thereby resulting in limited accessibility for their installation or removal.

SUMMARY OF THE INVENTION

An object of the present invention is to provide an interior power distribution substation which is in the form of a single building of extremely compact structure and which offers direct and level access to almost all of the equipments, even to maintenance trucks, by an access passage integral to the building.

The object of the invention is also to provide an interior power distribution substation where one or more transformers are located in a closed yard integral to the building and provided with a roof which may be opened and closed whenever desired, to permit cooling of the transformer(s) or recuperation of the heat generated by the transformer(s) whenever necessary.

More precisely, the power distribution substation according to the invention is of the type comprising:

a high voltage unit divided into cells, each cell containing high voltage incoming connection equipments connected by high voltage cables to a power source having a voltage between 60 kV and 245 kV;

transformers yard having at least one transformers connected to the incoming connection equipments;

a mid-voltage unit containing outgoing connection equipments connected to the at least one transformer and linked to output power lines for power distribution to a consumption pool under a voltage lower than or equal to 36 kV; and a control room;

the high voltage and mid-voltage units, the transformers yard and the control room being located in a single building having a roof.

This power substation which can be of the monocoque type is improved in that:

the high voltage incoming connection equipments, the at least one transformer and some of the outgoing connection equipments are located at the same level inside the building;

the substation includes an access passage that forms an integral part of the building, the passage being designed to insure direct access to the cells of the high voltage unit, the transformers yard and the mid-voltage unit; and the roof over the transformers yard is provided with means to open and close it in order to allow cooling of the at least one transformer or recuperation of the heat generated by the at least one transformer whenever necessary.

According to a first preferred embodiment of the invention, the cells of the high voltage unit are provided with transparent rolling doors giving a visual access to the high voltage incoming connection equipments. Means are also provided to limit access to the cells when the high voltage incoming connection equipments are under power.

According to a second preferred embodiment of the invention, the transformers yard is provided with an access door opening into the passage. The transformers yard is soundproofed by soundproof walls, as is the access door, and is provided with a fire-fighting system. To that effect, each of the one or more transformers are preferably located in a separate cell, and each cell in which a transformer is located includes a firebreak basin and protection walls. The transformers yard may also include a system for retaining oil including a water and oil separation/recuperation unit, a device for direct reading of quantity of oil accumulated in the separation/recuperation unit, and a system to drain off the water automatically.

According to a third preferred embodiment of the invention, the outgoing connection equipments of the mid-voltage unit are of the self-relieving switchless type and incorporate a removable circuit breaker permutation system. This improvement is particularly interesting, as it permits to reduce to a maximum the size of the power substation while making it much more efficient than larger substations.

The control room is preferably located above the mid-voltage unit standed on a pedestal floor and is provided with at least one window protected by a firebreak shutter, giving direct visual access to the transformer yard. The capacitors banks of the substation are preferably installed at the same level as the control room in the building.

According to a fourth preferred embodiment of the invention, the high voltage unit, the transformers yard and the mid-voltage unit are adjacent to each other in that respective order so as to have at least one common lateral wall. Thus, the access passage is straight, located along the common lateral wall and provided with an access door at one end.

As can now be better understood, the power distribution substation according to the invention is extremely compact. It can thus be used anywhere, whatever the geographic locations and geologic or environmental conditions may be. In use, the power distribution substation according to the invention is more specifically recommended for areas with a high density of population and where there is limited space available. However, it may also be installed in resort areas or other areas sensitive to the ecology.

By its structure, this power distribution substation insures superior security in areas where vandalism is high.

As can be appreciated, all the equipments of this substation are located in a closed building, protected from the elements. Therefore, the longevity of the substation is increased, its maintenance is decreased and the continuity index is greatly improved. The substation does however offer the possibility of opening the roof of the building over the transformer yard.

From a security standpoint, the design is unequalled: the high voltage unit is compartmentalized in cells and the mid-voltage unit and the capacitors banks are under metal-clad enclosure. Access to the high voltage equipment is advantageously protected by doors having locking ability and a fire-fighting system insures protection of the transformers both actively and passively.

From an environmental standpoint, the substation according to the invention offers many advantages. With respect to noise pollution, the substation is completely soundproof. With respect to chemical pollution, the substation may be provided with one of the world's most modern and efficient oil retention system. Finally, with respect to visual pollution, the substation, given a variety in architectural design, may blend into any environment.

BRIEF DESCRIPTION OF THE DRAWINGS

The present invention and its advantages will be more easily understood upon reading of the following non-restrictive description of several preferred embodiments thereof made with reference to the following drawings in which.

DETAILED DESCRIPTION OF THE INVENTION

General Presentation

Figure 1:
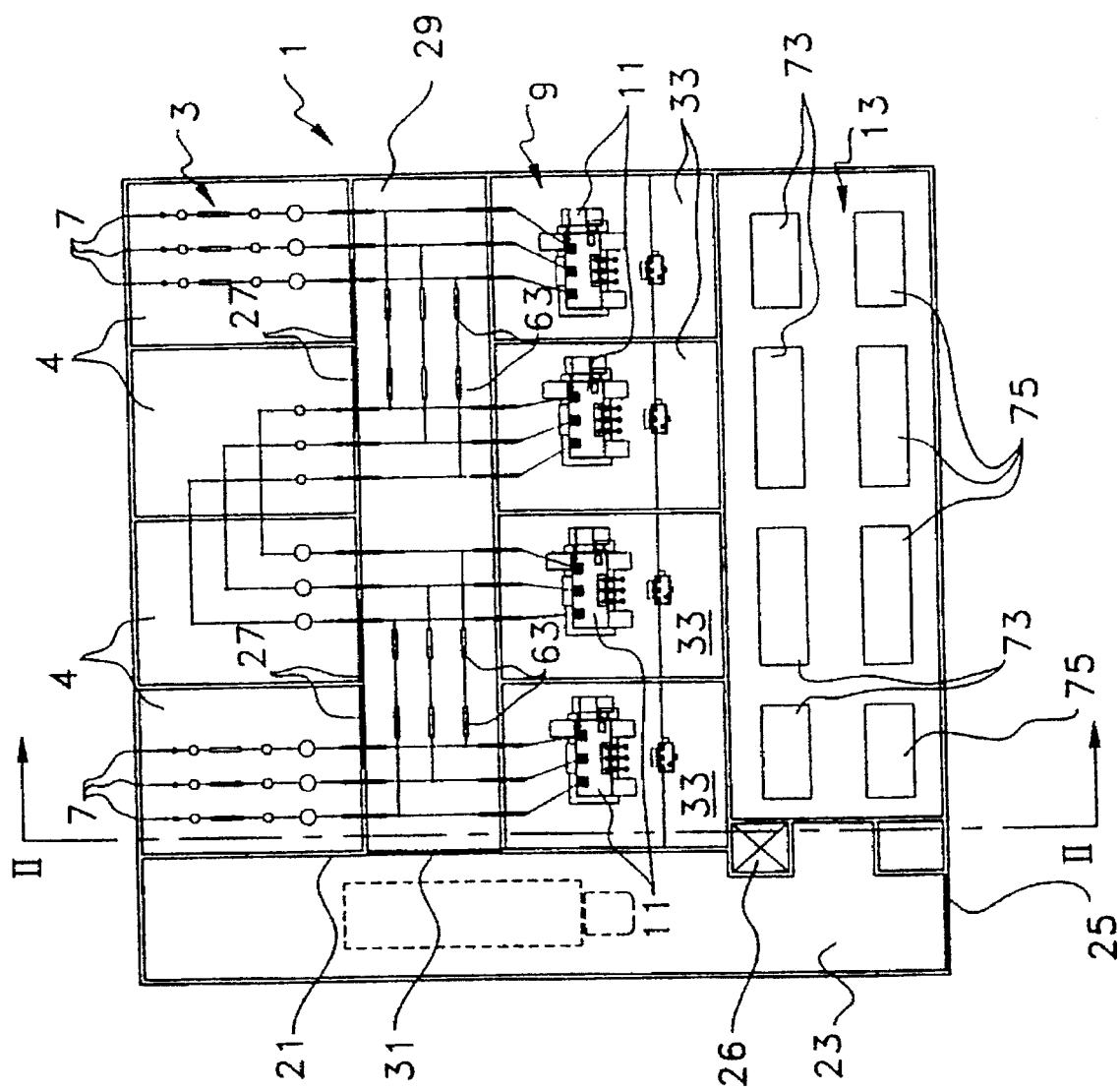
FIG. 1 is a schematic top plan view of the main floor of a power distribution substation according to a first preferred embodiment of the invention, this substation having four cells, each containing a transformer.
Figure 2:
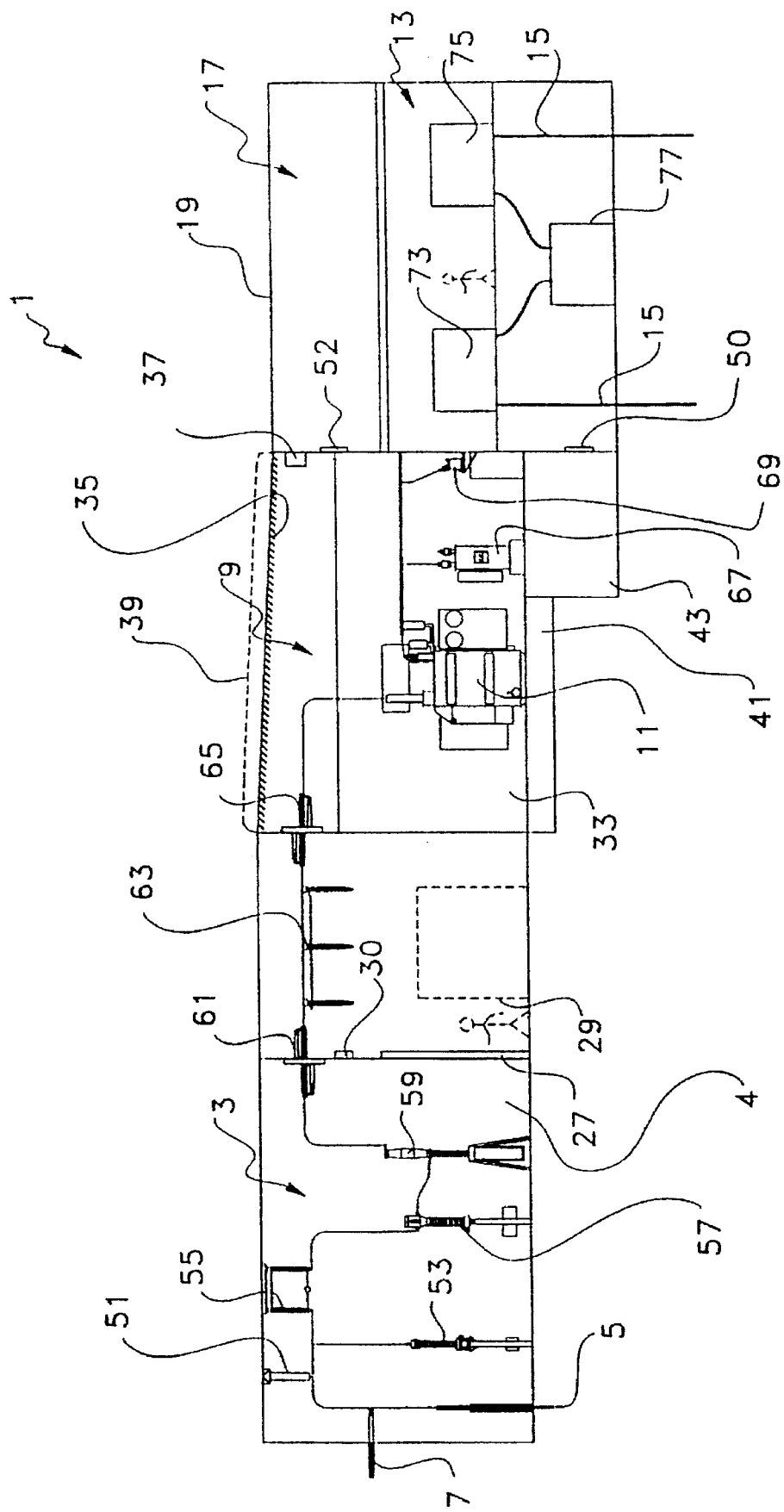
FIG. 2 is a cross-sectional view taken along line II—II of the power distribution substation shown on FIG. 1.

The power distribution substation 1 according to the preferred embodiment shown on FIGS. 1 and 2 has four main parts, viz.:

- a high voltage unit 3 compartmentalized in cells 4 and containing incoming connection equipments connected by high voltage cables 5 or 7 to a power source having a voltage between 60 kV and 245 kV;
- a transformer yard 9 containing four transformers 11 connected to the incoming connection equipments;
- a mid-voltage unit 13 containing outgoing connection equipments connected to the transformers 11 and linked to output power lines 15 for power distribution to a consumption pool under a voltage lower than or equal to 36 kV; and
- a control room 17 located above the mid-voltage unit 13.

As can be seen on FIG. 2, the high voltage and mid-voltage units 3 and 13, the transformer yard 9 and the control room 17 are located in a single building having a roof 19. This building may have, for example, a surface area of approximately 50 m×50 m. The high voltage unit 3, the transformer yard 9 and the mid-voltage unit 13 are preferably adjacent to each other in that respective order, so as to have at least one common lateral wall 21.

As can also be seen on FIG. 2, the incoming connection equipments of the high voltage unit 3, the at least one transformer and an important part of the outgoing connection equipments of the mid-voltage unit 13 are located at the same level in the building. This is an important characteristic of the invention.

According to another important characteristic of the invention, the substation 1 includes an access passage 23 which forms an integral part of the building and is designed to insure direct access to the cells 4 of the high voltage unit 3, the transformer yard 9 and the main floor of the mid-voltage unit 13. As shown on FIG. 1, the access passage 23 is preferably straight and located along the common lateral wall 21. It is also provided with an access door 25 at one end. This access passage may be several meters wide (about 8 meters), so that it can be easily taken by trucks. Given its position, this access passage may also be used as a parking lot when required, particularly by the maintenance staff.

Each of the four main parts of the substation 1 will now be described in greater detail.

High Voltage Unit

As previously mentioned, the high voltage unit 3 is compartmentalized in cells 4. Each of these cells is built in masonry and is provided with a transparent rolling door 27 permitting, in particular, to see whether the switches are opened or closed.

Preferably, means may be provided so that the door 27 of each cell 4 has a signalling system 30 (red or green light) to indicate whether or not the cell 4 is under power.

Access to each cell 4 is possible with a maintenance truck because of the access passage 23 and a passage 29 provided in the transformers yard. This is an important difference with existing substations, where access is impossible by truck and where the equipments are located on two different levels.

As previously mentioned, the high voltage cables connecting the incoming connection equipments to the power source may be underground 5 or aerial 7, which makes the substation extremely versatile in use.

Transformers Yard

As shown on FIG. 2, the transformers yard 9 includes a passage 29 connected to the access passage 23 by an access door 31. It also includes a plurality of cells 33 where the transformers 11 are located.

Because of the access passage 23 and the passage 29, installation of the transformers 11 may be done by electromechanic wagon directly from the sidewalk. This feature is particularly interesting, especially where a narrow street does not permit access of a platform truck to the substation. It may be noted that the cells 4 and the transformers 11 are accessed underneath the powered bars, without having to switch off them.

According to an important characteristic of the invention, the roof of the building over the transformers yard 9 is provided with means to open and close it in order to permit cooling of the transformers 11 or recuperation of the heat generated by them whenever necessary.

The means to open and close the roof preferably comprise of swivelling metallic slats 35 and mechanical means 37 to pivot them. These mechanical means 37 may advantageously be automated as a function of the temperature of the yard 9. Furthermore, a protection system such as wire fencing 39 may be provided to prevent animals and birds from entering the transformers yard 9 and cause a break down.

Using slats 35 or any other means to open and close the roof of the yard 9 is very interesting. In existing substations, when the transformers are in an enclosure, fans must be added to the structure, which generates noise outside the substation. On the other hand, when the transformers are outside, the noise generated by them must be muted. To overcome all these problems, the yard 9 is preferably soundproofed by soundproof walls, as is the access door 31. This completely reduces the risk of noise pollution. The access door 31 is preferably a rolling door, which, as such, is mounted on wheels with a rail on the floor and a guide in the upper part to permit manually opening of it and gives the necessary clearance to install transformers and any other equipment.

The access door 31 is preferably made of absorbent materials coated with an envelope and sandwiched by metallic panes, where the surface that is exposed to the noise source is perforated. The panes are mounted on a metallic frame. A system is provided to maintain electrical continuity between the panes, the rail, the guide and the frame, and the whole assembly is grounded.

Advantageously, the transformer yard 9 may be provided with active and passive fire-lighting systems. The active system may comprise sprinklers or mist jets. The passive system may comprise a firebreak basin as well as the walls that compartmentalize the transformers 11 in cells 4.

Oil Retention System

In an effort to reduce chemical pollution, the transformer yard 9 may comprise an oil retention system to contain any leaks. The system includes a device to instantly read the quantity of oil accumulated in the oil retention system and a system to automatically drain off the water.

Figure 3:
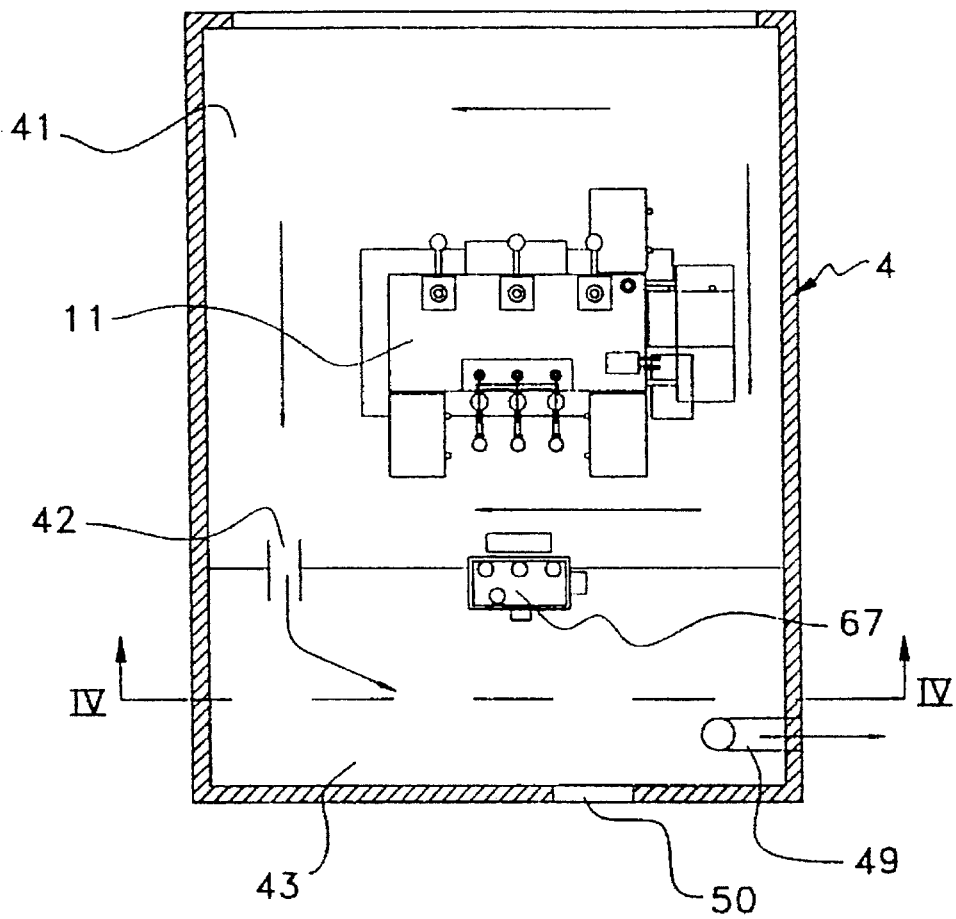
FIG. 3 is a top plan view of one of the cells for a transformer of the substation shown on FIGS. 1 and 2, including an oil retention system.
Figure 4:
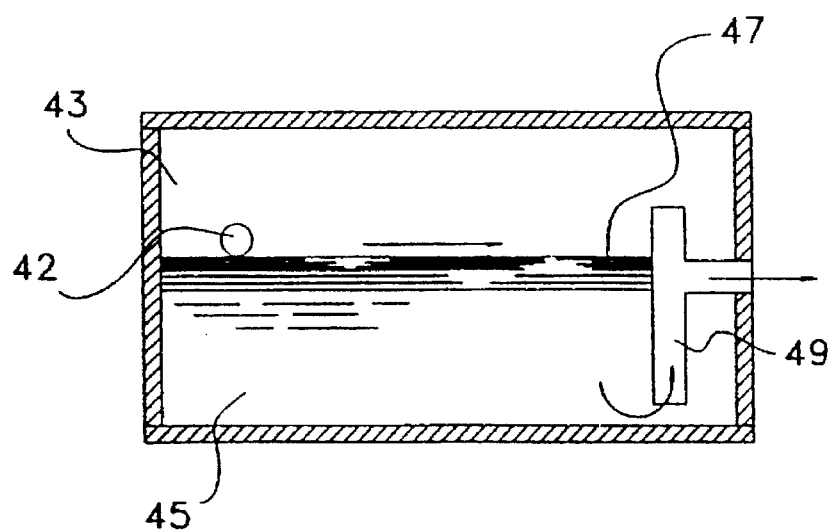
FIG. 4 is a side elevational view of the separation/recuperation unit of the oil retention system shown on FIG. 3.

As better shown on FIGS. 1, 3 and 4, the oil retention system is essentially divided into two parts: a basin 41 and a separation/recuperation unit 43.

The basin 41 surrounds the transformer 11 and collects rain water or water from the sprinklers in case of a fire. It also collects the leaking or spilled oil. The basin is filled with gravel having two different granularities. The superior layer is designed to extinguish the life caused by an ignited oil by eliminating the oxygen supply, while the inferior layer is designed to insure drainage of the liquids. The basin 41 has an angled flagstone at the bottom to insure convergence of the water and the oil towards at least one opening 42 communicating with the separation/recuperation unit adjacent to the basin.

The separation/recuperation unit 43 comprises a large container into which the water and oil coming from the basin 41 may flow. In this unit 43, separation of the water and oil is based on the different densities between these liquids and on fluid mechanics.

The unit 43 is always filled with water 45 at its maximum level (see FIG. 4). In the event of an oil leak, the oil 47 remains at the surface because of its lower density and the surplus water is evacuated by a vertical tube 49 having an opening near the bottom of the container.

All the dimensions of this unit 43 (length, width, depth and volume) are determined according to parameters outlined by the American Petroleum Institute (API) so that the degree of pollution in the evacuated water does not exceed 15 ppm.

A visual device with a graduated system which, for example, incorporates a window 50 (see FIG. 2), is provided to instantly read off the quantity of oil in the separation/recuperation unit.

Mid-voltage Unit

The mid-voltage unit 13 is preferably located on two levels, and the superior level is almost on the same level as the level of the transformer yard 9.

This unit 13 includes, on the superior level, principal connecting blocs 73 and 75 and, on the inferior level, a junction bloc 77. The structure and operation of these blocs which constitute the outgoing connection equipments, will be described in detail hereinafter. It is sufficient to indicate here that, according to a particularly original characteristic of the invention, the outgoing connection equipments are of the self-relieving switchless type and incorporate a removable circuit breaker permutation system. This new design brings another dimension and a great flexibility of exploitation to the substation. It permits, for example, to have a capacity of 36 outgoing mid-voltage lines in a substation having a limited surface area, which is enormous.

The installation of the equipments at their respective levels may be carried out by a lift 26 and a travelling crane from a landing place located in the access passage 23.

The structure of the substation also permits to make thermographs in order to control the quality of the connections.

Control Room

As shown on FIG. 2, the control room 17 is preferably located on a pedestal floor over the mid-voltage unit. It is then provided with at least one window 52 protected by a firebreak shutter, giving direct visual access to the transformers yard 9.

The control room may be equipped with an ALCID (trade-mark) microprocessor command system.

Other Structural Elements

The substation 1 comprises, as all other similar substations, at least one capacitors bank under metalclad enclosure. This bank, not shown, is preferably located at the same level as the control room. Given its size, no less that 8 banks may be installed, in absolute security and with no wasted space.

In areas where the ground does not offer a sufficiently rigid base, the building may advantageously be given a monolithic concrete base.

Furthermore, in order to insure maximum flexibility and to ease installation of the equipments, ducts may be incorporated in the walls and slabs of the building, through which the command cables may be passed.

Electrical Circuit

Figure 6A:
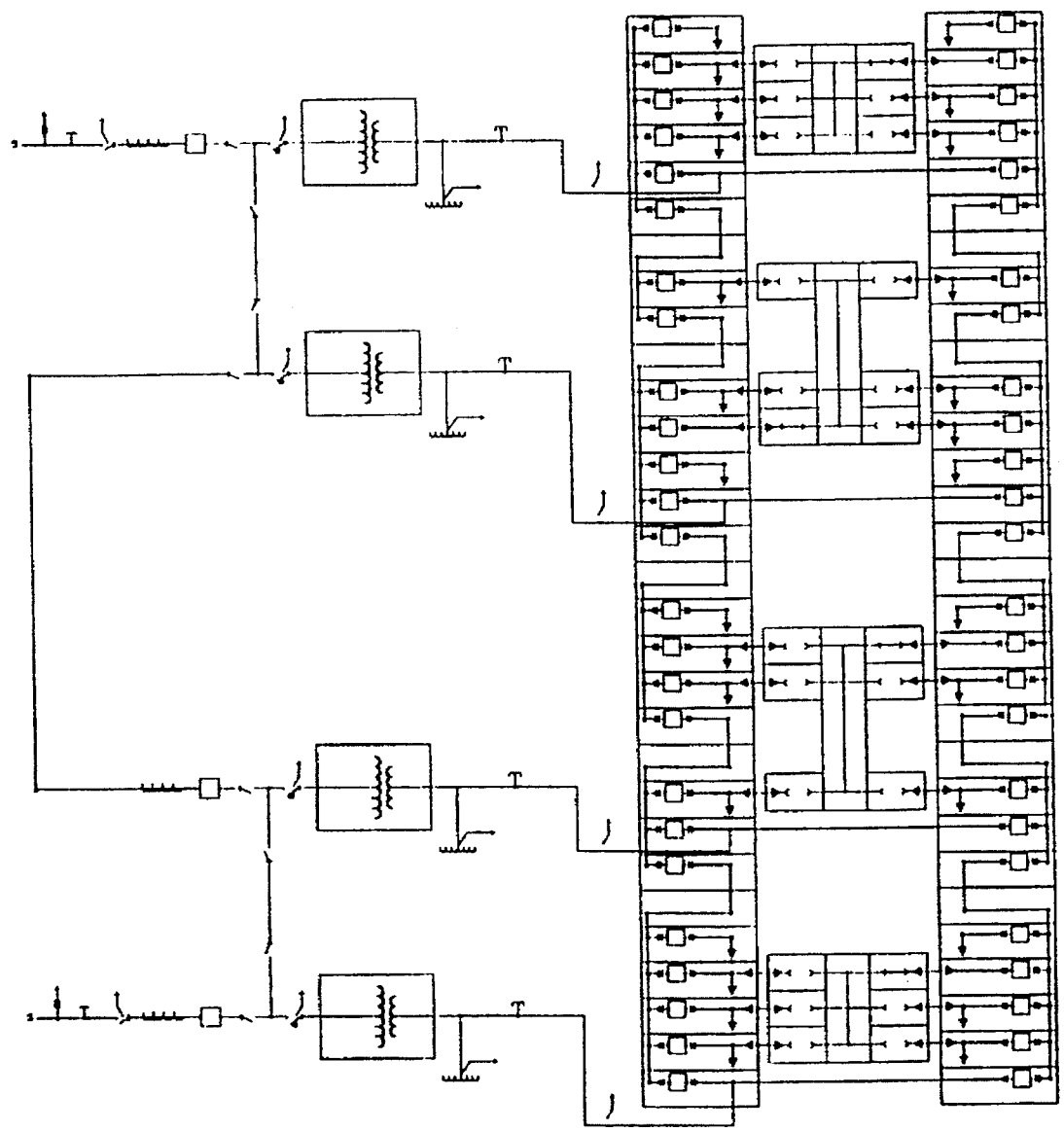
FIG. 6a is a single line diagram of the electrical circuit of the substation shown on FIGS. 1 and 2, including 20 outgoing mid-voltage lines.
Figure 6B:
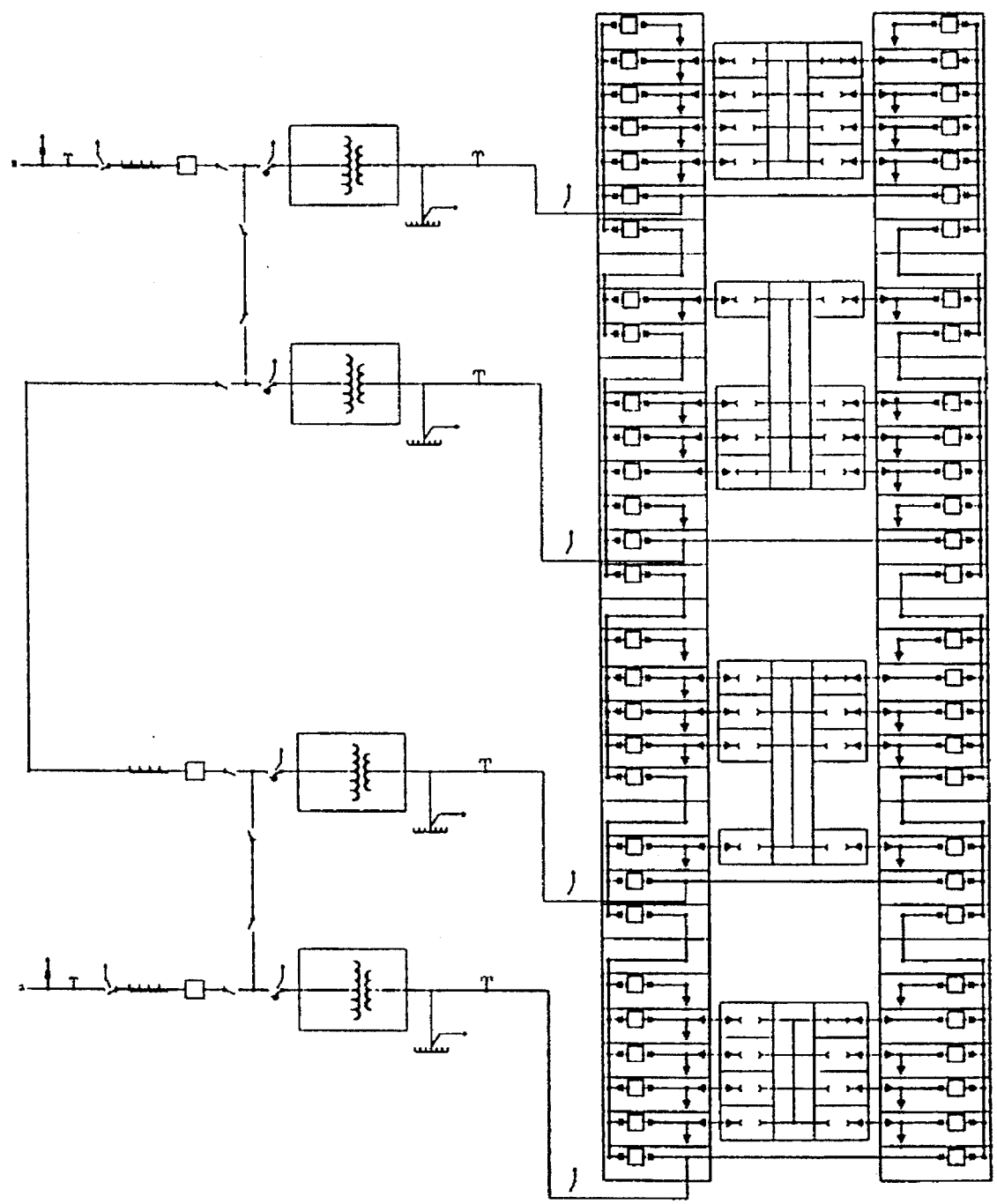
FIG. 6b is a single line diagram of a variant of on the electrical circuit shown on FIG. 6a, including 28 outgoing mid-voltage lines.

The electrical circuit of the substation I shown on FIGS. 1 and 2 is shown on FIG. 6a and 6b.

In the embodiment shown in FIG. 6a, the substation is of conventional structure and includes 20 outgoing lines.

In the embodiment shown in FIG. 6b, the substation includes 28 outgoing lines. In certain cases, the substation may include up to 36 outgoing lines, which is exceptional in such a compact substation.

In order to simplify the description, the electrical circuit that will be described hereinafter is the one shown on FIG. 8. This is the circuit of a power distribution substation even more compact than the substation 1 shown on FIGS. 1 and 2. This more compact substation, numbered 1' on FIG. 7, includes only two cells in its transformer yard 9 and, in the embodiment shown, only one transformer 11. It must be understood that the same structural and operational description may easily be generalized to a more complex circuit, including several transformers 11 connected in parallel.

Figure 7:
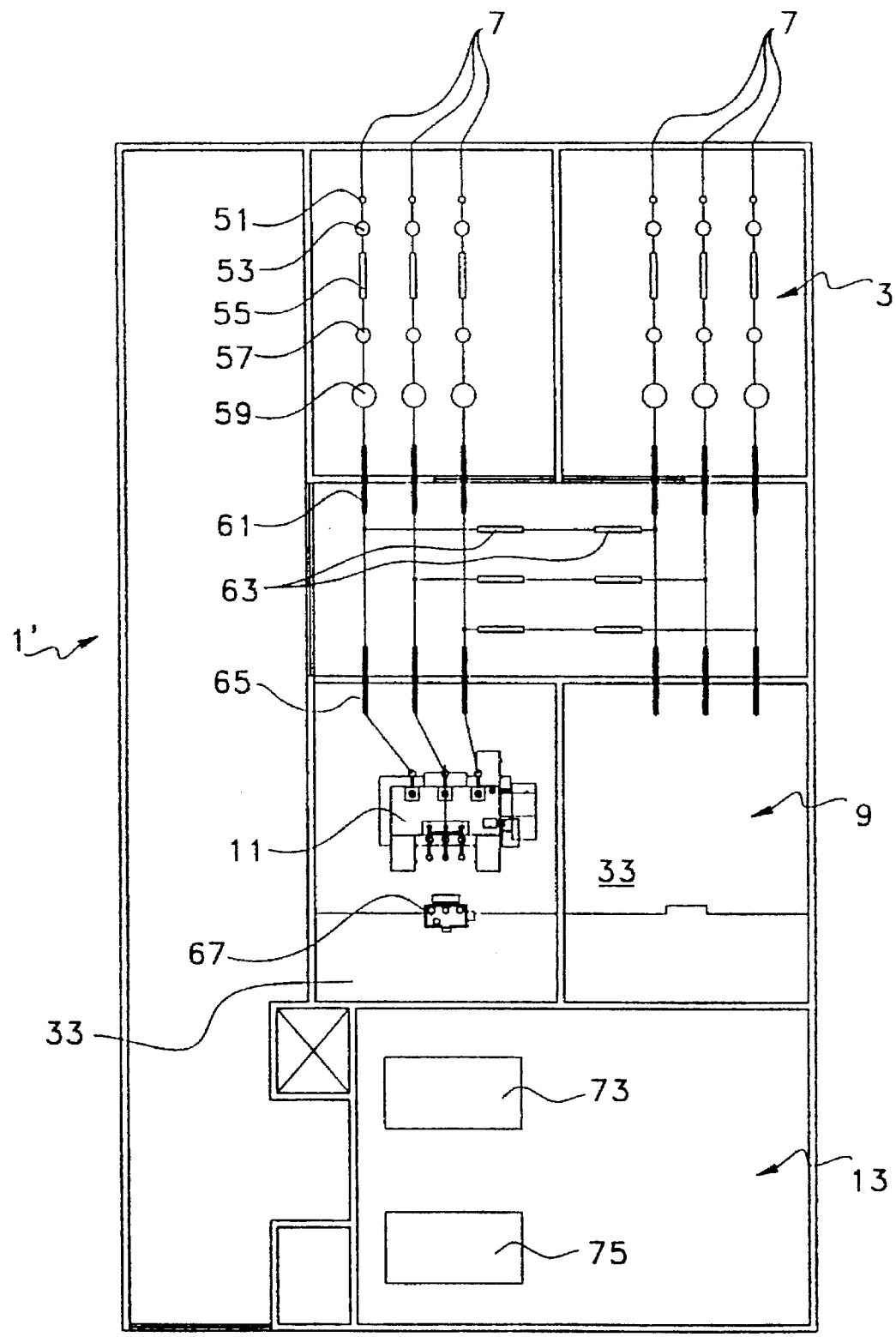
FIG. 7 is a top plan view of the main floor of a power distribution substation according to a second preferred embodiment of the invention, including two cells where only one of the cells includes a transformer.
Figure 8:
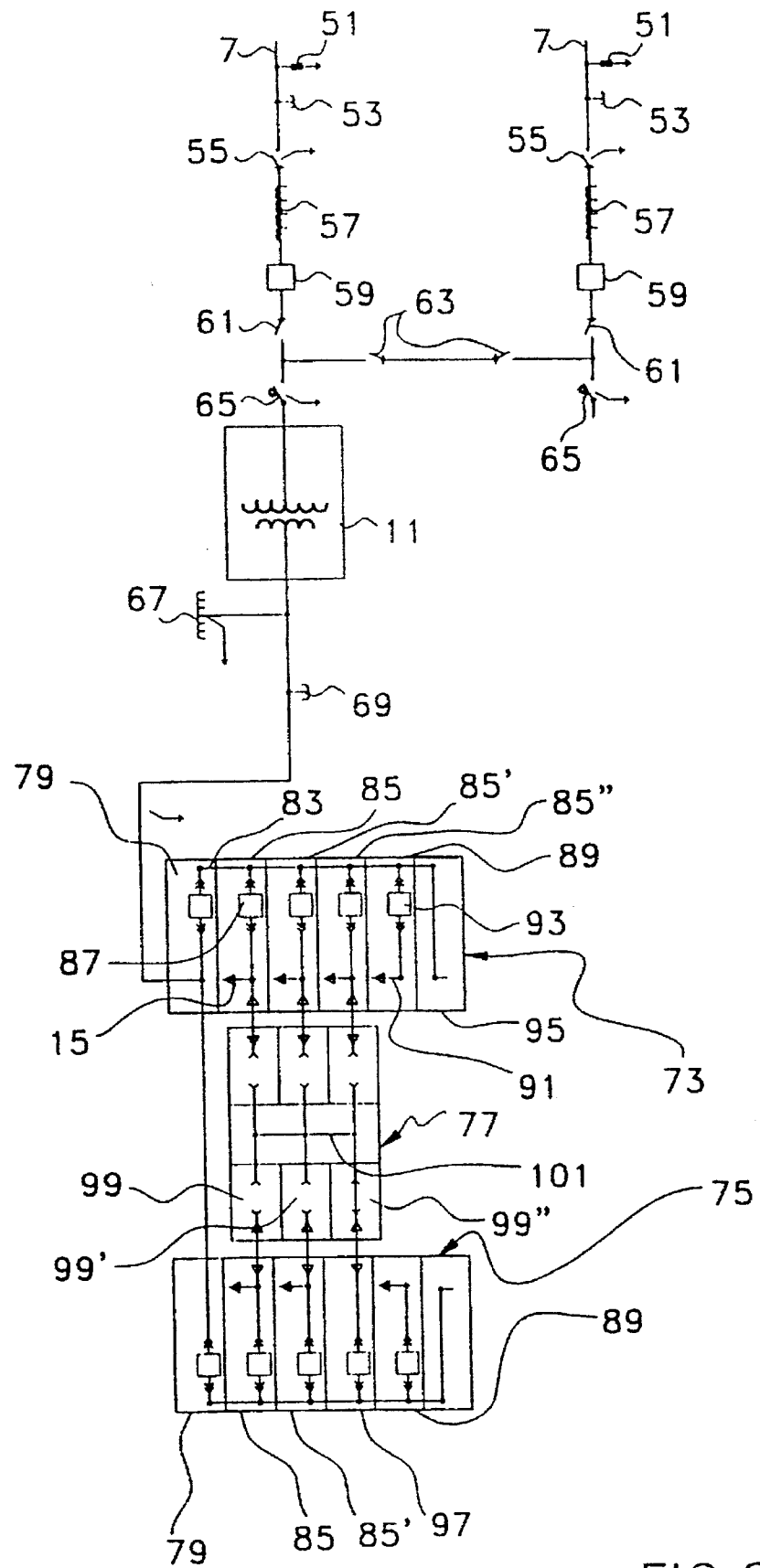
FIG. 8 is a single line diagram of the electrical circuit of the substation shown on FIG. 7, including 5 outgoing mid-voltage lines.

As can be seen on FIG. 7 and 8, as well as on FIG. 2, which is equally applicable to substation 1', the substation 1' is fed by two aerial incoming cables 7 (or underground cables 5). Each of the compartments of the high voltage unit includes a lightning arrester 51, a voltage transformer 53, a disconnect-switch 55, a current transformer 57, a circuit breaker 59 and a rotary switch 61, all connected in series to the incoming line.

In the transformers yard 9, the extremities of the circuits of the two high voltage compartments are interconnected with disconnect-switches 63, which allows substitution of one of the incoming lines for the other when such is required for repairs or maintenance. The disconnect-switches 63 are located over the passage 29 giving access to the cell in which the transformer 11 is located.

The joined extremities of the two incoming lines are interconnected by a second rotary switch 65 connected to the transformers 11. The mid-voltage output of the transformer is interconnected to the outgoing interconnection equipments 73 of the mid-voltage unit 13. As is common practice, the mid-voltage output of the transformer 11 may be associated to a grounded inductance 67, particularly for YΔ transformers, and to a voltage transformer 69.

Figure 5:
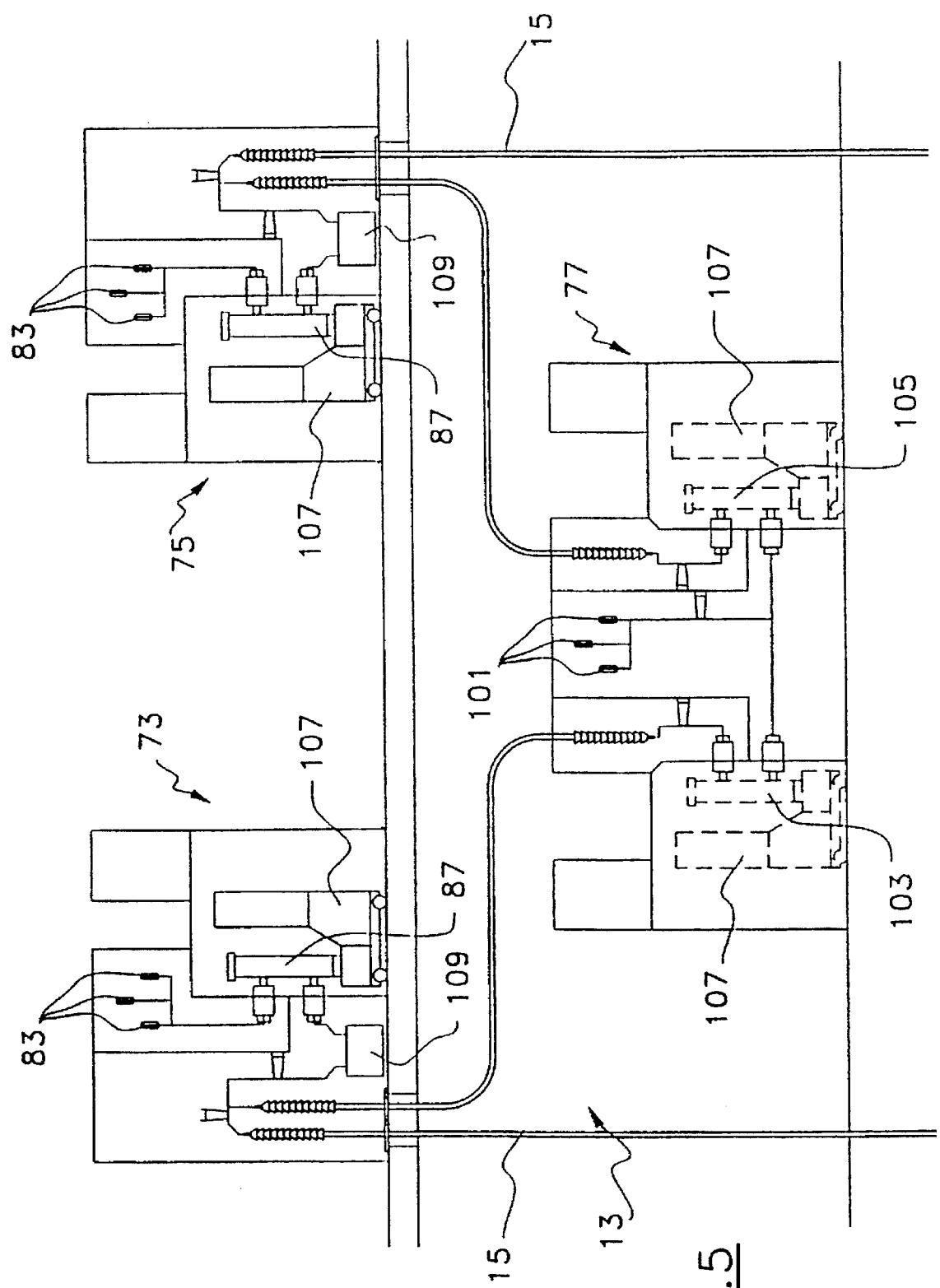
FIG. 5 is a cross-sectional view of the mid-voltage unit of the substation shown on FIGS. 1 and 2.

The outgoing interconnection equipments in the mid-voltage unit 13 comprise two main blocs 73, 75 located on the superior level and a junction bloc 77 located on the inferior level (see FIGS. 1 and 5).

Figure 9A:
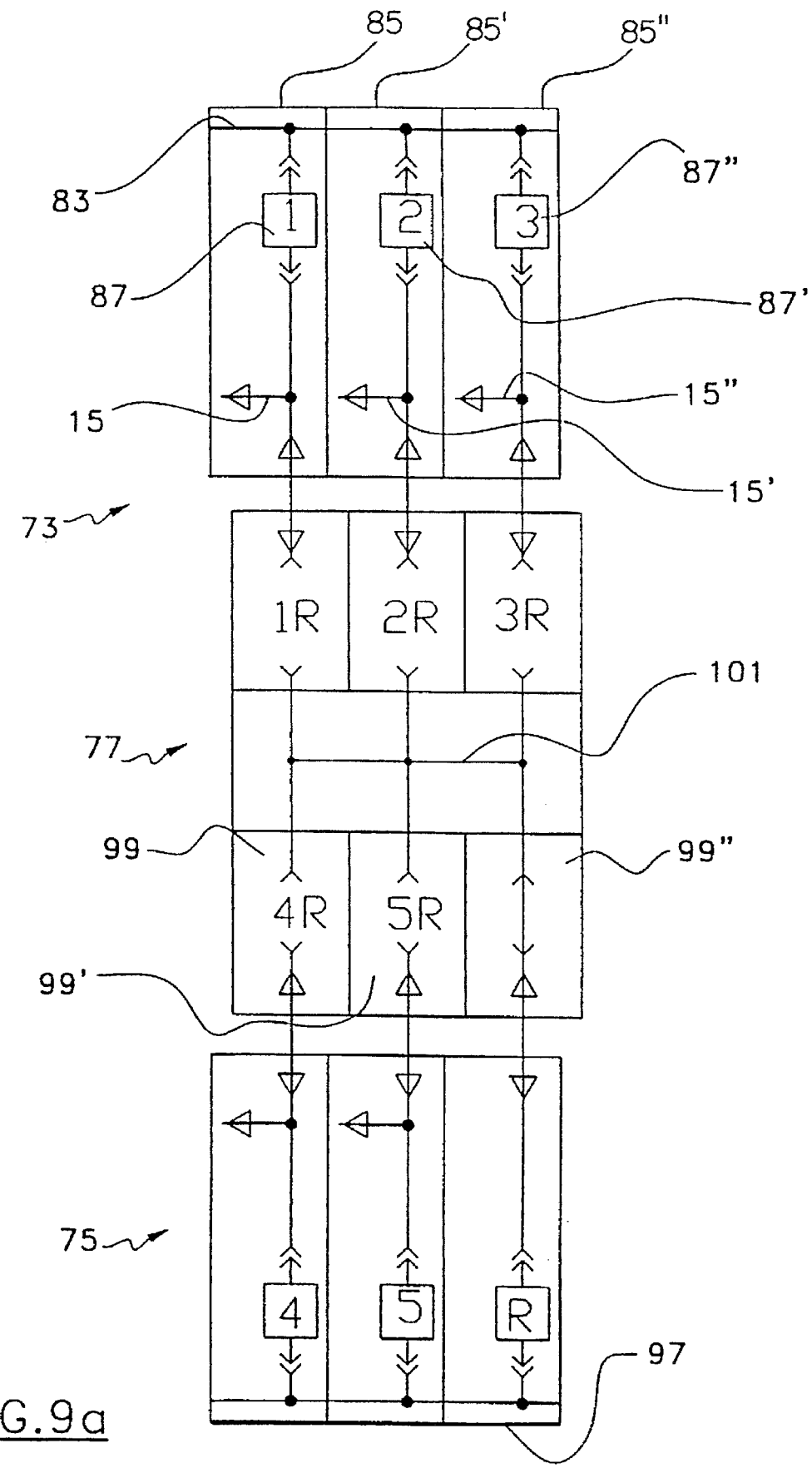
FIG. 9a to 9c are single line diagrams showing how to carry out a "relief" during maintenance or repair of one of the circuit breakers of the mid-voltage unit.

Each main bloc 73, 75 is made up of cells. More precisely, the bloc 73 includes an input cell 79 in which the output of the transformer 11 is connected to a principal bar 83 by a removable circuit breaker 81. The principal bar 81 extends along a plurality of output cells 85, 85', 85", in each of which the principal bar 83 is connected through a removable circuit breaker 87, 87', 87" to an output line 15, 15', 15" (see FIG. 9a) feeding the consumption pool. The principal bar 83 also goes through another cell 89 where it is connected through a removable circuit breaker 93 to another output line 91 to feed the capacitors banks (not shown) previously referred to. This bank is preferably of the double star type, with insulated ground, and it helps to regularize the voltage and to compensate for inductive losses. The bloc 73 also includes a transition cell 95 which permits to join the principal bar 83 to the one of another similar adjacent bloc where there is more than one transformer 11 (see FIGS. 6a and 6b).

The other main bloc 75 is built and connected to the transformer 11 in the same way as the bloc 73, with the exception that one of the cells 97 has a removable circuit breaker but no output line. For the purpose of simplicity, the cells of the other bloc similar to those of the first have been identified with the same reference numbers.

The junction bloc 77 is located on a lower floor in order to make the substation 1 as compact as possible. It comprises a plurality of cells 99, 99', 99" corresponding to the output cells 85, 85', 85" and/or 97 of the main blocs 73 and 75. These cells 99, 99', 99" are interconnected by a secondary bar 101, itself connected to the principal bar of the main bloc 75 through the cell 97. Each of the cells 99 and 99' comprise two opposite outputs permanently connected to the corresponding outputs of the principal blocs and which, if need be, may be connected to the secondary bar 101 by removable circuit breakers. The cell 99" also comprises an output permanently connected to the corresponding output of the cell 85" of the main bloc 73 and which may be connected to the secondary bar 101 through another removable circuit breaker.

Under normal operating conditions (see FIG. 9a), each mid-voltage line 15, 15', 15" is fed by the principal bar 83 of the corresponding main bloc through the removable circuit breaker 87, 87', 87". The junction bloc 77 thus does not contain any removable circuit breaker. During maintenance or repair on one of the removable circuit breakers, for example the one numbered 87 in the cell 85 of the bloc 73, there can be no interruption of service on the corresponding mid-voltage line 15. In this case, it could be proceeded with a "relief".

Figure 9B:
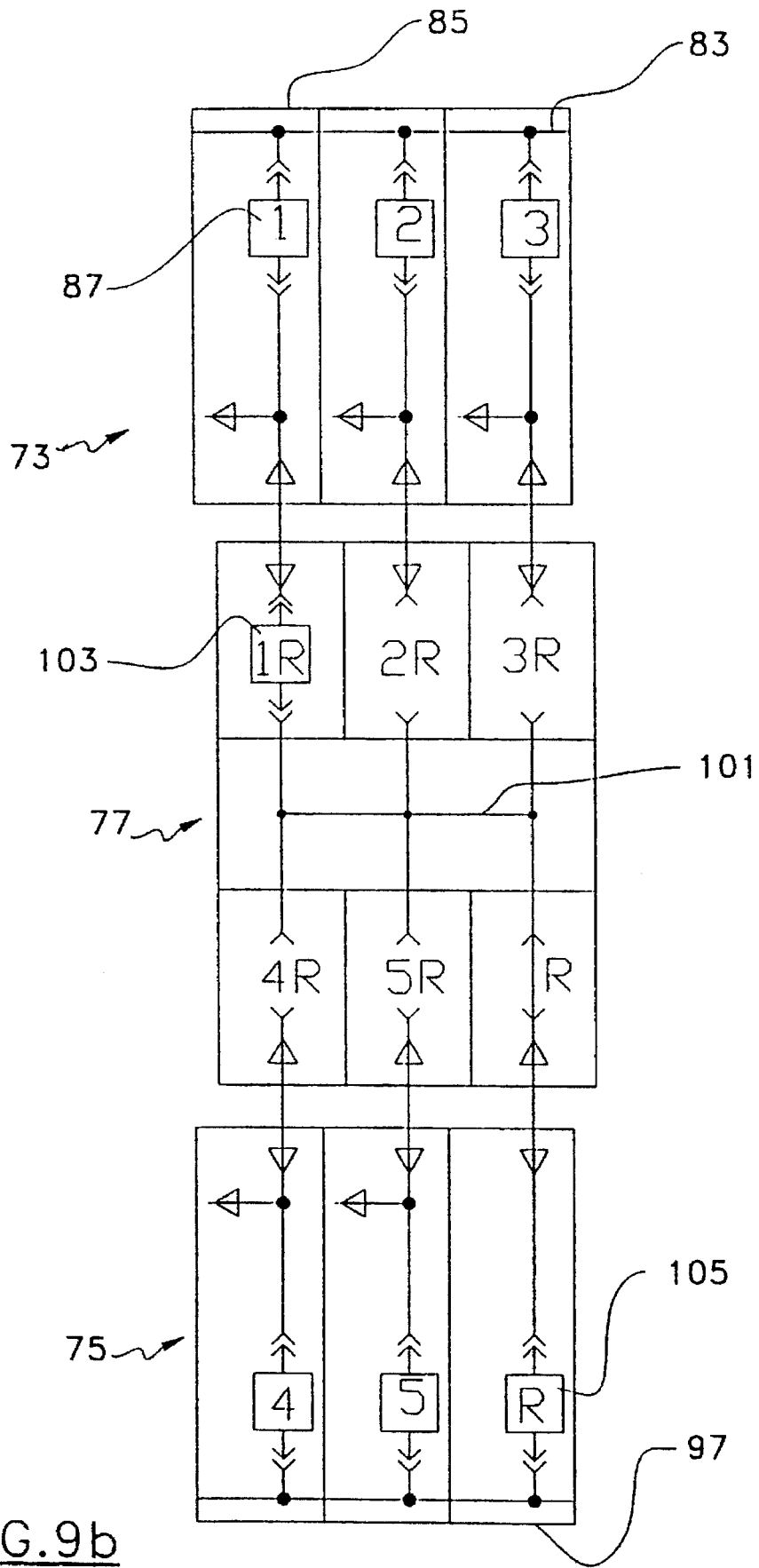

To do so (see FIG. 9b), one inserts a circuit breaker 103 in position IR in the cell 99 of the junction bloc 77 and then closes the circuit breaker 103 and the circuit breaker 105 of the cell 97.

The outgoing mid-voltage line 15 is thus fed by two sources: the principal bars 83 of the two main blocs 73, 75.

Figure 9C:
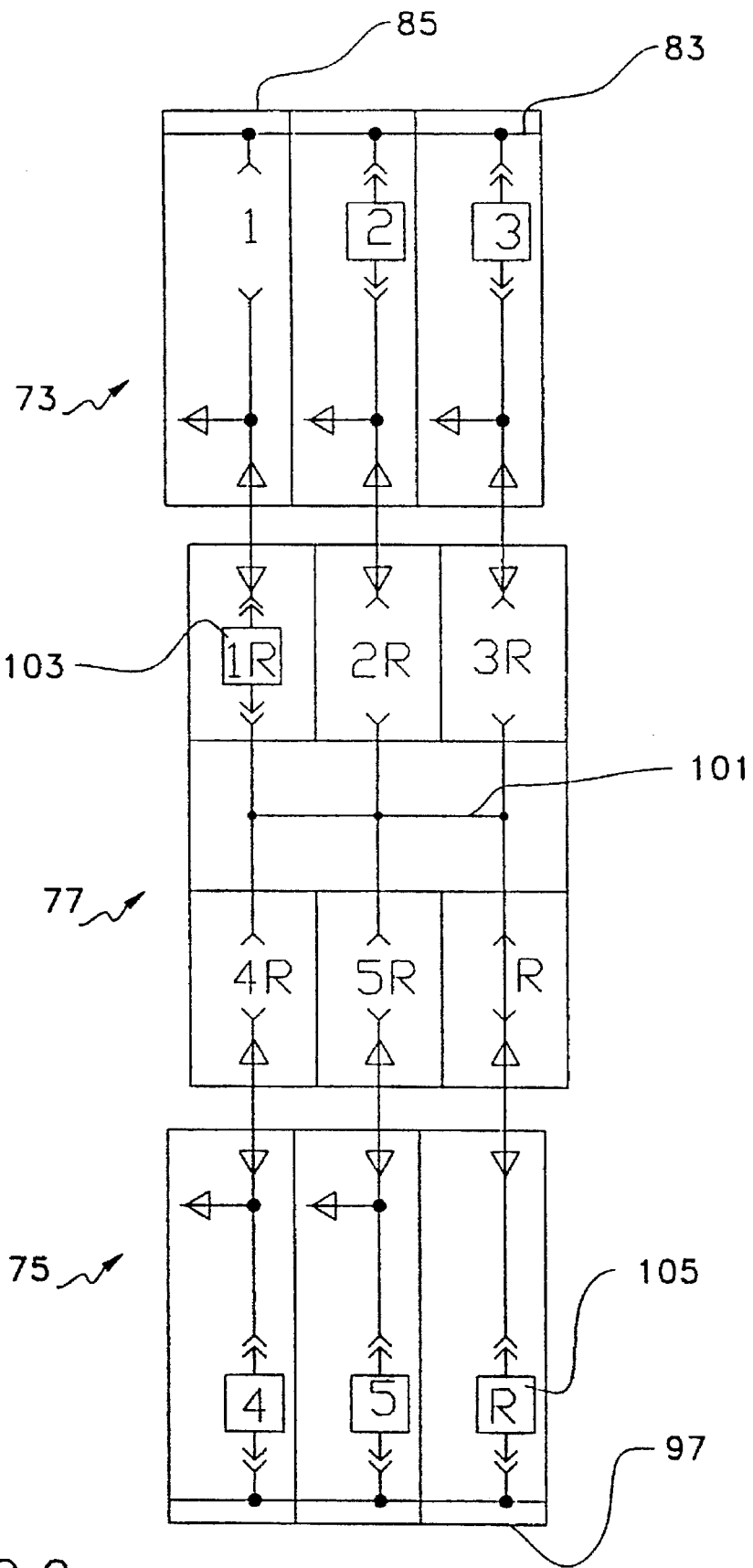

To complete the relief (see FIG. 9c), it is sufficient to open the circuit breaker 87 and to remove it. The outgoing mid-voltage line 15 is thus fed by the principal bar of the bloc 75 through the secondary bar 101 and the relief circuit breakers 105 and 103, without having had any power interruption to the consumer. Maintenance of the circuit breaker 87 and of the protection and control circuits is thus possible.

Of course, this same principle may be applied to any other outgoing line of the power distribution substation.

Thus, as can be seen, the outgoing connection equipments of the mid-voltage unit of the power distribution substation according to the invention are of the self-relieving switch-less type, relief being accomplished when necessary by an extremely simple removable circuit breaker permutation system. To that effect and as can be seen on FIG. 5, the removable circuit breakers 87, 103 and 105 are preferably mounted on mobile autonomous trolleys 107. Measuring or control devices 109 may also be provided.

Advantages of the Invention

As can now be understood, the power distribution substation according to the invention is, by design, extremely compact. By way of example, in the case of the embodiment shown on FIG. 1, the substation may have an area of 50 m×50 only, while offering the possibility of 28 outgoing mid-voltage lines with a voltage lower than 150 kV.

It is incorporated in a single building, which can be a monolithic concrete base and of variable architecture and geometry, and which includes an access passage covered by a roof and sufficiently large to permit access by a platform truck for delivery of the transformers. This access passage may also serve as a parking lot for maintenance vehicles.

A travelling crane may be provided for unloading the transformers.

The control cables are installed in ducts incorporated into the walls and slabs of the building.

Because of its variable structure and architecture, the substation may be integrated into any environment. It offers complete invisibility, it is inaccessible from the outside and it is soundless. This shelters it from vandalism and complaint of an ecological nature.

All the high voltage elements designed for exterior use are protected from the climatic conditions. Thus, the longevity of the substation is greatly increased as compared to the existing substations.

From a security aspect, it offers protection to the public, to the staff and to the equipments.

Finally, it presents an evolutional single line diagram for 1, 2, 3 and even 4 transformers.

Although the present invention has been explained hereinabove by way of preferred embodiments thereof; it should be pointed out that any modifications to these preferred embodiments within the scope of the appended claims is not deemed to alter or change the nature and scope of the present invention.

What is claimed is:

1. A power distribution substation, comprising:

a high-voltage unit divided into cells, each cell containing incoming connection equipment connected by high voltage cables to a power source having a voltage between 60 kV and 245 kV;

a transformer yard having at least one transformer connected to said incoming connection equipment;

a mid-voltage unit containing outgoing connection equipment connected to said at least one transformer and linked to output power lines for power distribution to a consumption pool under a voltage lower than or equal to 36 kV; and a control room containing a substation command and control system;

said high voltage and mid-voltage units, said transformer yard and said control room being located in one building under a same roof;

wherein:

said incoming connection equipment, said at least one transformer and the outgoing connection equipment are located on a same level inside said building;

said substation includes an access passage that forms an integral part of said building, said passage being designed to insure direct and level access for a motorized vehicle to the cells of said high-voltage unit, the transformer yard and the mid-voltage unit;

the roof over said transformer yard is provided with means to open and close said roof to allow cooling of said at least one transformer and recuperation of heat generated by said at least one transformer; and the cells of the high-voltage unit are provided with transparent rolling doors giving a visual access to said incoming connection equipment, and with means to limit access to said cells when the incoming connection equipment within said cells are under power.

2. The power distribution substation according to claim 1, wherein said high voltage cables are aerial.

3. The power distribution substation according to claim 1, wherein said high voltage cables are underground.

4. The power distribution substation according to claim 1, wherein:

said transformer yard is provided with an access door opening into said passage;

said transformer yard is soundproofed by soundproof walls; and said access door is soundproofed.

5. The power distribution substation according to claim 4, wherein each transformer of said transformer yard is located in a separate cell and wherein said transformer yard comprises a system for retaining oil including a water and oil separation/recuperation unit, a device for direct reading of the quantity of oil accumulated in said separation/recuperation unit, and a system to drain off water automatically.

6. The power distribution substation according to claim 5, wherein said means to open and close the roof of the building over said transformers yard comprise swivelling slats and means to pivot said slats.

7. The power distribution substation according to claim 6, wherein said means to pivot said slats are automated as a function of the temperature of said transformer yard, and wherein a protection system is provided to prevent animals from entering said transformer yard.

8. The power distribution substation according to claim 6, wherein said transformer yard is provided with an active fire-fighting system and each cell in which a transformer is located includes a firebreak basin and protection walls.

9. A power distribution substation, comprising:

a high-voltage unit divided into cells, each cell containing incoming connection equipment connected by high voltage cables to a power source having a voltage between 60 kV and 245 kV;

a transformer yard having at least one transformer connected to said incoming connection equipment;

a mid-voltage unit containing outgoing connection equipments connected to said at least one transformer and linked to output power lines for power distribution to a consumption pool under a voltage lower than or equal to 36 kV; and a control room containing a substation command and control system;

said high-voltage and mid-voltage units, said transformer yard and said control room being located in one building under a same roof;

wherein:

said incoming connection equipment, said at least one transformer and the outgoing connection equipment are located on a same level inside said building;

said substation includes an access passage that forms an integral part of said building, said passage being designed to insure direct and level access for a motorized vehicle to the cells of said high-voltage unit, the transformer yard and the mid-voltage unit;

the roof over said transformer yard is provided with means to open and close said roof to allow cooling of said at least one transformer and recuperation of heat generated by said at least one transformer; and the outgoing connection equipment are of the self-relieving switchless type and incorporate a removable circuit breaker permutation system.

10. The power distribution substation according to claim 9, further comprising at least one capacitor bank under a metalclad enclosure.

11. The power distribution substation according to claim 10, wherein said control room is located on a pedestal floor and said at least one capacitor bank is located at the same level as said control room.

12. The power distribution substation according to claim 11, wherein said control room is located above said mid-voltage unit and is provided with at least one window protected by a firebreak shutter, giving direct visual access to said transformer yard.

13. A power distribution substation, comprising:

a high-voltage unit divided into cells, each cell containing incoming connection equipment connected by high voltage cables to a power source having a voltage between 60 kV and 245 kV;

a transformer yard having at least one transformer connected to said incoming connection equipment;

a mid-voltage unit containing outgoing connection equipment connected to said at least one transformer and linked to output power lines for power distribution to a consumption pool under a voltage lower than or equal to 36 kV; and a control room containing a substation command and control system;

said high-voltage and mid-voltage units, said transformer yard and said control room being located in one building under a same roof;

wherein:

said incoming connection equipment, said at least one transformer and the outgoing connection equipment are located on a same level inside said building;

said substation includes an access passage that forms an integral part of said building, said passage being designed to insure direct and level access for a motorized vehicle to the cells of said high-voltage unit, the transformer yard and the mid-voltage unit; and the roof over said transformer yard is provided with means to open and close said roof to allow cooling of said at least one transformer and recuperation of heat generated by said at least one transformer.

14. The power distribution substation according to claim 13, wherein said building has a monolithic concrete base.

15. A power distribution substation, comprising:

a high-voltage unit divided into cells, each cell containing incoming connection equipment connected by high voltage cables to a power source having a voltage between 60 kV and 245 kV;

a transformer yard having at least one transformer connected to said incoming connection equipment;

a mid-voltage unit containing outgoing connection equipment connected to said at least one transformer and linked to output power lines for power distribution to a consumption pool under a voltage lower than or equal to 36 kV; and a control room containing a substation command and control system;

said high-voltage and mid-voltage units, said transformer yard and said control room being located in one building under a same roof;

wherein:

said incoming connection equipment, said at least one transformer and the outgoing connection equipment are located on a same level inside said building;

said substation includes an access passage that forms an integral part of said building, said passage being designed to insure direct and level access for a motorized vehicle to the cells of said high-voltage unit, the transformer yard and the mid-voltage unit;

the roof over said transformer yard is provided with means to open and close said roof to allow cooling of said at least one transformer and recuperation of heat generated by said at least one transformer; and said high-voltage unit, said transformer yard and said mid-voltage unit are adjacent to each other in that respective order so as to have at least one common lateral wall and wherein said passage is straight, located along said common lateral wall and provided with an access door at one end.

16. The power distribution substation according to claim 15, wherein:

the cells of the high voltage unit are provided with transparent rolling doors giving a visual access to said incoming connection equipment, and with means to limit access to said cells when the incoming connection equipment within said cells are under power;

said transformer yard is soundproofed by soundproof walls and provided with a soundproof access door opening into said passage;

each transformer of said transformer yard is located in a separate cell which includes a firebreak basin and protection walls;

said transformer yard is provided with an active firefighting system and with a system for retaining oil including a water and oil separation/recuperation unit, a device for direct reading of the quantity of oil accumulated in said separation/recuperation unit, and a system to drain off water automatically;

the outgoing connection equipment of the mid-voltage unit are of the self-relieving switchless type and incorporate a removable circuit breaker permutation system; and the control room is located above said mid-voltage unit and is provided with at least one window protected by a firebreak shutter, giving direct visual access to said transformer yard.

17. A power distribution substation, comprising:

a high-voltage unit divided into cells, each cell containing incoming connection equipment connected by high voltage cables to a power source having a voltage between 60 kV and 245 kV;

a transformer yard having at least one transformer connected to said incoming connection equipment;

a mid-voltage unit containing outgoing connection equipment connected to said at least one transformer and linked to output power lines for power distribution to a consumption pool under a voltage lower than or equal to 36 kV; and a control room containing a substation command and control system;

said high-voltage and mid-voltage units, said transformer yard and said control room being located in one building under a same roof;

wherein:

said incoming connection equipment, said at least one transformer and the outgoing connection equipment are located on a same level inside said building;

said substation includes an access passage that forms an integral part of said building, said passage being designed to insure direct and level access for a motorized vehicle to the cells of said high-voltage unit, the transformer yard and the mid-voltage unit;

the roof over said transformer yard is provided with means to open and close said roof to allow cooling of said at least one transformer and recuperation of heat generated by said at least one transformer; and said incoming and outgoing equipment and said at least one transformer are connected to said control room by conductors passing through ducts incorporated into walls and slabs of said building.

* * * * *